(12) United States Patent
Donaldson (10) Patent No.: US 7,339,463 B2
(45) Date of Patent: Mar. 4, 2008

(54) INFANT ALERT SYSTEM AND METHODS THEREOF

(76) Inventor: Mary J. Donaldson, 324 Caracas Dr., Las Vegas, NV (US) 89145

( * ) Notice: Subject to any disclaimer, the term of this patent is extended or adjusted under 35 U.S.C. 154(b) by 185 days.

(21) Appl. No.: 11/257,248

(22) Filed: Oct. 24, 2005

(65) Prior Publication Data
US 2007/0090938 A1 Apr. 26, 2007

(51) Int. Cl.
*B60Q 1/00* (2006.01)
(52) U.S. Cl. .............. 340/457; 340/573.1; 340/667; 340/522; 180/272
(58) Field of Classification Search ........... 340/457, 340/573.1, 573.4, 425.5, 667, 522; 180/272, 180/273, 271, 290; 280/734, 735
See application file for complete search history.

(56) References Cited

U.S. PATENT DOCUMENTS

| | | | |
|---|---|---|---|
| 5,793,291 A * | 8/1998 | Thornton ................. | 340/573.1 |
| 6,104,293 A | 8/2000 | Rossi | |
| 6,714,132 B2 * | 3/2004 | Edwards et al. ......... | 340/573.1 |
| 6,819,249 B1 | 11/2004 | Papp | |
| 6,922,147 B1 * | 7/2005 | Viksnins et al. ......... | 340/573.1 |
| 7,079,016 B2 * | 7/2006 | Ho et al. ................ | 340/426.25 |
| 7,218,218 B1 * | 5/2007 | Rogers ...................... | 340/522 |

* cited by examiner

*Primary Examiner*—Anh V. La
(74) *Attorney, Agent, or Firm*—David Landman (57) ABSTRACT

An infant seat alarm system to both detect and alert the presence of an unattended infant in a vehicle comprises an infant seat having a sensor and a detector seat having a second sensor. The sensor is coupled to the second sensor and both sensors are coupled to a timer device. A power supply independent of a power supply of the vehicle powers the timer device. One or more alarms are coupled to the timer device. After a predetermined time the timer device actuates at least one of the alarms to emit an audible sound if the infant seat is occupied by an infant and the detector seat is unoccupied by a person. An external alarm may be coupled to the timer device. Additionally a switch operable by a person may be coupled to both the timer device and the sensor of the infant seat.

20 Claims, 7 Drawing Sheets

INFANT ALERT SYSTEM AND METHODS THEREOF

FIELD OF THE INVENTION

This invention relates to infant safety, and more specifically, to infant safety in a vehicle when an infant is left unattended in the vehicle and methods thereof.

BACKGROUND OF THE INVENTION

In the past, many accidental deaths of children have occurred because children were left unattended in a vehicle by an adult. Such accidents are prevalent where weather conditions outside the vehicle become extreme (too hot or too cold) and the environment in the vehicle risks the life of any infant in the vehicle.

Rossi, U.S. Pat. No. 6,104,293 disclosed a child safety detection warning system coupled to a vehicle ignition system. More recently, Papp, U.S. Pat. No. 6,819,249 disclosed yet another child detection system including a warning system for detecting the presence of a child in a vehicle. According to the Papp disclosure, the warning system is activated when the vehicle ignition is turned off and detects the presence of the child by means of pressure sensors under a child seat.

In an alternative approach to providing infant safety when the infant is placed in a safety seat of a vehicle, an adult should be present in the vehicle with the infant to assure the infant's safety. Most often the adult is the driver of the vehicle. In most cases it is the driver of the vehicle who places the infant in the vehicle. A responsible passenger may also be in the vehicle. Therefore, it is desirable for the presence of the infant to be detected by any adult in the vehicle, and that an alert occur when the adult has left the vehicle without attending to the safety needs of the infant.

SUMMARY OF THE INVENTION

For the foregoing reasons, there is a need to provide an improved infant safety seat alert system coupled to another seat occupied by an adult in a vehicle, which would alert the adult that the infant needs attention, and should not be left unattended in the vehicle. Alternatively, another device manipulated by an adult may be coupled to an improved alert system, which would alert the adult that the infant needs attention, and should not be left unattended in the vehicle. Such an improved system provides an advantage compared to other previously disclosed systems because detection of the presence of an unattended infant in a vehicle directly depends on the actions of an adult, such as a driver or other person of the vehicle.

An infant seat alarm system to both detect and alert the presence of an unattended infant in a vehicle is clearly desirable. In order to accommodate all the above requirements, the improved infant seat alarm system may include an infant seat having a first sensor located in a portion of the infant seat and a detector seat having a second sensor located in a portion of the detector seat. Moreover, the improved infant seat alarm system may include a timer device coupled to both the first sensor and the second sensor. The timer device may be powered by a power supply that is independent of the vehicle power supply. When the detector seat is unoccupied by an adult and the infant seat is occupied by an infant, a timer circuit of the timer device may actuate an alarm that emits an audible sound after a predetermined countdown time of the detector seat when the detector seat remains unoccupied by the adult.

Accordingly, it is an object of this invention to provide an improved infant seat alarm system having both an infant seat occupied by an infant and at least one detector seat occupied by a person with both the infant seat and the detector seat coupled to a timer device communicating with an alarm.

It is a further object of this invention to provide an improved infant seat alarm system having a timer device with a power supply independent of a power supply of a vehicle coupled to the timer device.

It is still a further object of this invention to provide an improved infant seat alarm system having both a switch manipulated by a person and an infant seat coupled to a timer device coupled to an alarm.

It is a still further object of this invention to provide an improved method of both detecting and alerting a person that an infant is unattended in a vehicle.

PREFERRED EMBODIMENTS OF THE INVENTION

In accordance with one embodiment of this invention, an infant seat alarm system configured to both detect and alert the presence of an unattended infant in a vehicle is disclosed. The infant seat alarm system comprises, in combination an infant seat in the vehicle, the infant seat having a first weight sensing switch located in a portion of the infant seat and a detector seat in the vehicle, the detector seat having a second weight sensing switch located in a portion of the detector seat. The system has a timer device comprising a housing and a timer circuit, each of the first weight sensing switch and the second weight sensing switch being coupled to both a portion of the housing and to the timer circuit. The first weight sensing switch is coupled to the second weight sensing switch. The system further comprises at least one power supply, the at least one power supply being coupled to a portion of the timer device, and at least one alarm coupled to the timer circuit. The timer circuit is configured to actuate the at least one alarm to emit an audible sound after a predetermined time if both the infant seat is occupied and the detector seat is unoccupied with both the first weight sensing switch being closed and the second weight sensing switch being closed to complete the timer circuit.

In accordance with another embodiment of this invention, an infant alert system configured to both detect and alert the presence of an unattended infant in a vehicle is disclosed. The infant alert system comprises, in combination an infant seat in the vehicle, the infant seat having a first sensor, a detector seat in the vehicle, the detector seat having a second sensor, the first sensor coupled to the second sensor, a timer device coupled to each of the first sensor and the second sensor; and at least one alarm coupled to the timer device. The timer device is configured to actuate the at least one alarm to emit an audible sound after a predetermined time when both the first sensor detects the infant seat is occupied and the second sensor detects the detector seat is unoccupied.

In accordance with another embodiment of this invention, a method of both detecting and alerting that an infant is unattended in a vehicle is disclosed. The method comprises the steps of providing an infant seat in the vehicle, the infant seat having a first sensor; providing a detector seat in the vehicle, the detector seat having a second sensor, the first sensor being coupled to the second sensor; and providing a timer device coupled to each of the first sensor and the second sensor. The method further comprises the steps of powering the timer device with at least one power supply independent of a power source of the vehicle; providing at least one alarm coupled to the timer device; and emitting an audible sound by the at least one alarm after a predetermined time if both the first sensor detects the infant seat is occupied and the second sensor detects the detector seat is unoccupied.

The foregoing and other objects, features, and advantages of the invention will be apparent from the following, more detailed description of the preferred embodiments of the invention, as illustrated in the accompanying drawings.

DESCRIPTION OF THE INVENTION

In this application the following abbreviations have been used to simplify reading of this disclosure:

SW1—first weight sensing switch;

SW2—second weight sensing switch.

Figure 1:
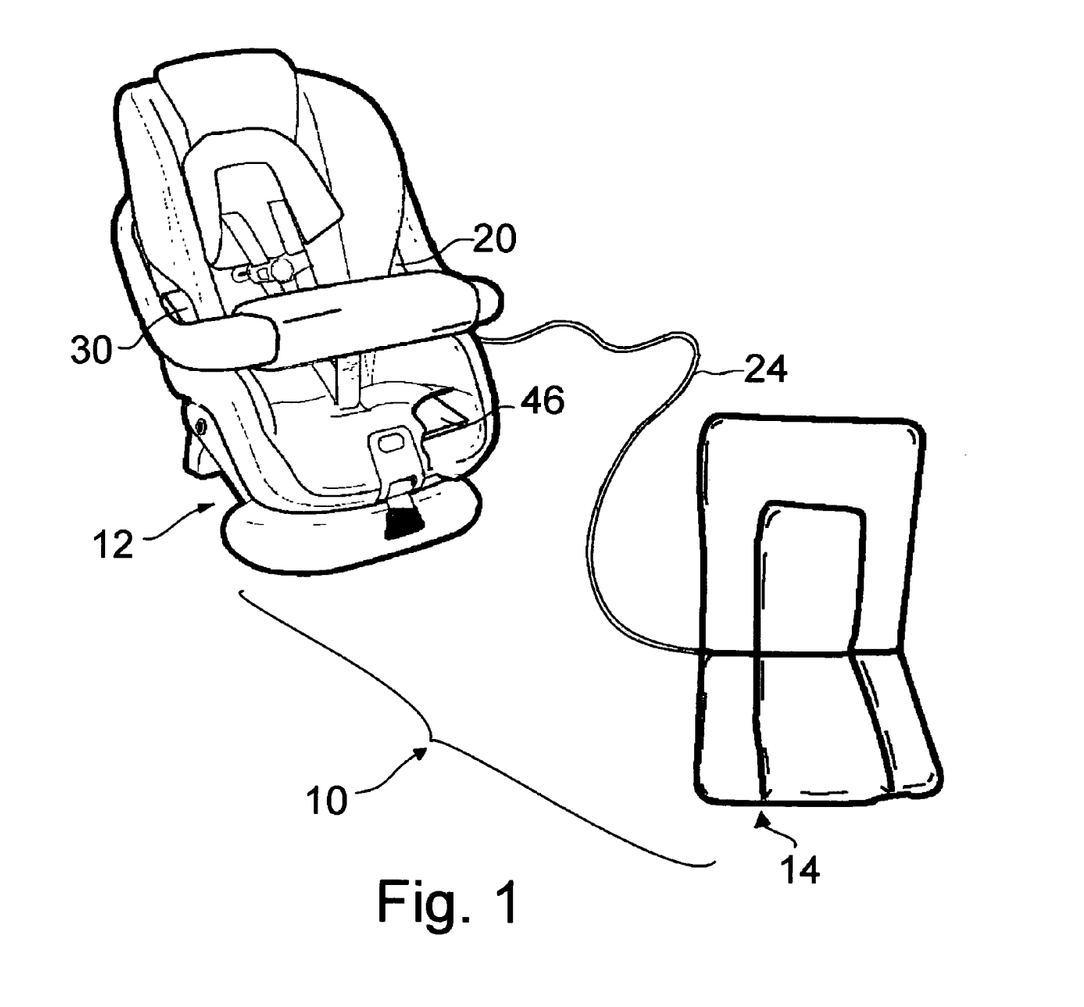
FIG. 1 is a perspective view of a front side of an infant seat alarm system including an infant seat coupled to a detector seat in accordance with this invention.

According to FIG. 1, in an embodiment of an infant seat alarm system 10 configured to both detect and alert the presence of an unattended infant in a vehicle, the system comprises an infant seat 12 in the vehicle, the infant seat having a first weight sensing switch (SW1) 16 located in a portion of the infant seat. Furthermore, the system 10 includes a detector seat 14 in the vehicle. The detector seat 14 may have a second weight sensing switch (SW2) 18 located in a portion of the detector seat (not shown in FIG. 1, but shown in FIG. 5A and described below).

A portion of the SW1 16 may be coupled to a timer device 20 (also shown in FIG. 3B and described below). The detector seat 14 may comprise a portion of a fixed seat of the vehicle. Alternatively, the detector seat 14 may comprise a removable seat cushion placed on a fixed seat of the vehicle. In one embodiment the detector seat 14 may be located on a driver seat of the vehicle. The detector seat 14 may be any seat of the vehicle unoccupied by the infant seat 12.

Figure 6:
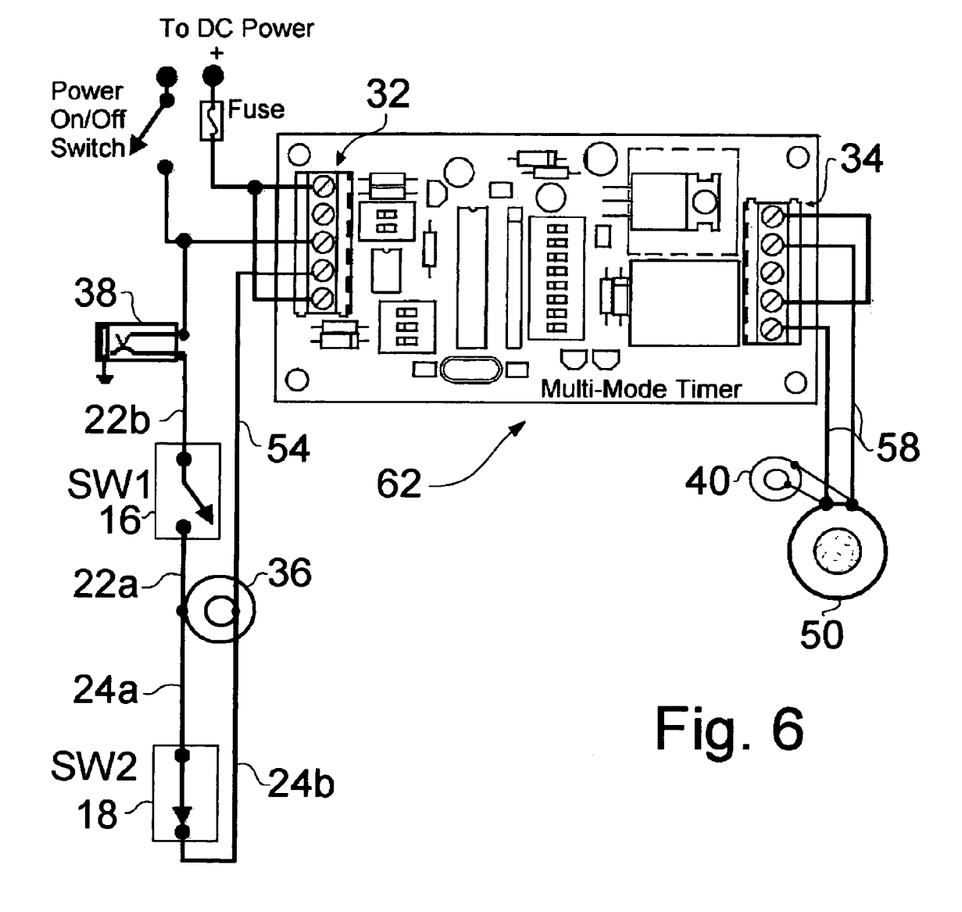
FIG. 6 is a schematic of a wiring diagram of an inner portion of the timer device of FIG. 2.

In one embodiment the timer device 20 may be located on a portion of the infant seat 12 (see also FIGS. 2 and 3A), but the timer device 20 may be located anywhere in the vehicle. The timer device 20 may comprise a housing 28. The housing 28 may include one or more timer circuits 62 having a first timer circuit interface 32 and a second timer circuit interface 34 (see FIG. 6 and the description below). A portion of the SW1 16 and a portion of the SW2 18 may be both coupled to a portion of the housing 28 when a lead (not shown) of at least one second weight sensing switch wire (abbreviated as SW2 wire) 24 is coupled to a first jack 36 of the housing 28 (see FIG. 6 and the description below). Furthermore when the lead of the at least one SW2 wire 24 of the SW2 18 is coupled to the first jack 36, a detector seat wire 54 couples a portion of the SW2 to a portion of the first timer circuit interface 32 (see FIG. 6 and the description below). In the illustration of FIG. 6 (see description below) when the lead of the at least one SW2 wire 24 is coupled to the first jack 36, a portion of the SW1 16 is coupled to a portion of the SW2 18 in electrical series.

Figure 2:
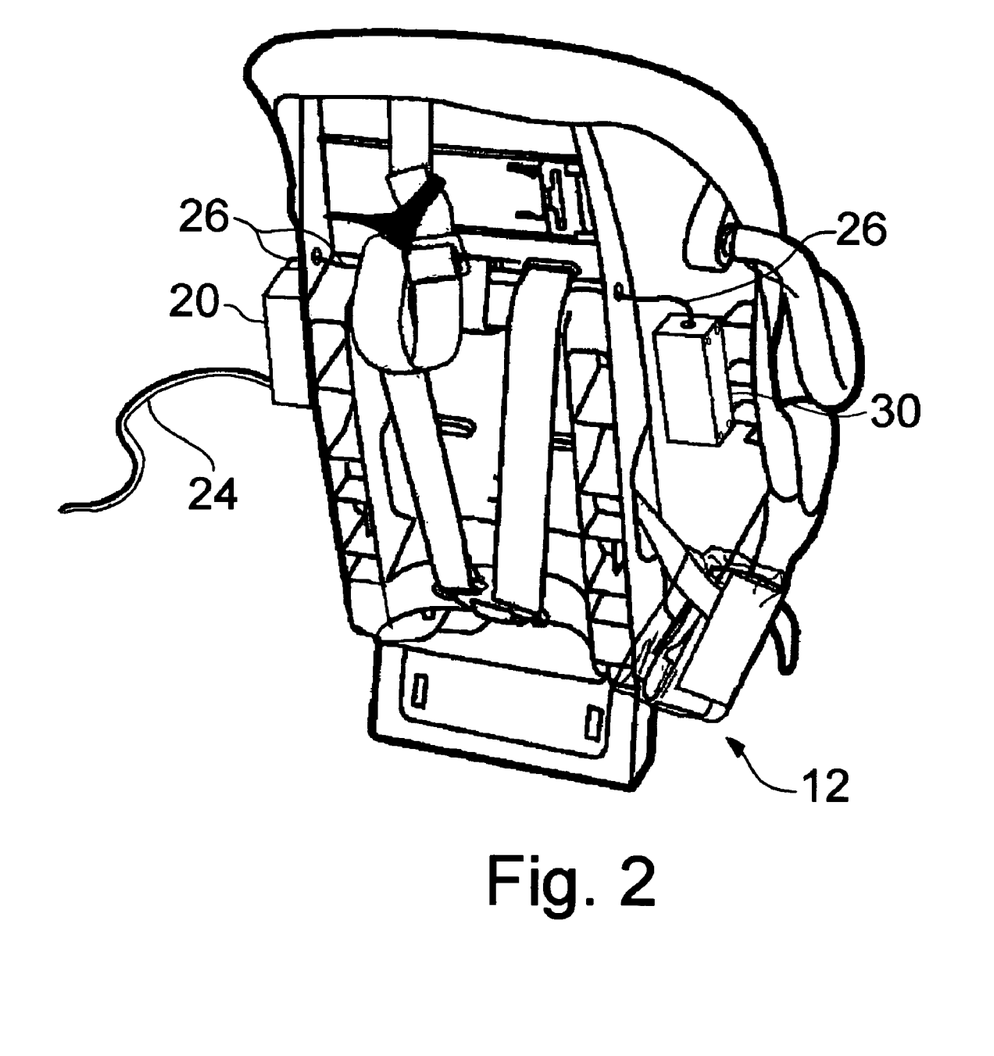
FIG. 2 is a perspective view of a back side of the infant seat of FIG. 1 including a housing of a timer device and a power supply.

The infant seat alarm system 10 may further comprise a power supply 30 (see also FIG. 2A). In one embodiment the power supply 30 may be located on a portion of the infant seat 12, but the power supply may be located anywhere in the vehicle. The power supply 30 may be coupled to a portion of the timer device 20 and may provide power independently of a power source of the vehicle.

After a predetermined countdown time the timer circuit 62 (see FIG. 6 and the description below) of the timer device 20 may actuate at least one alarm 50 (see FIG. 3B and the description below). The alarm 50 may be coupled to the housing 28 to emit an audible sound if both the infant seat 12 is occupied by an infant and the detector seat 14 is unoccupied by a person (such as a driver of the vehicle). In one embodiment of the infant seat alarm system 10, the predetermined countdown time may be at least about one minute.

The alarm 50 may be located on a portion of the housing 28 (see FIG. 3A and the description below) or the alarm may be located on a portion of the vehicle (see FIG. 7 and the description below). The alarm 50 may comprise a speaker. Alternatively, the alarm 50 (or any other alarm of the vehicle coupled to the timer device 20) may comprise a light or a combination of a light and an audible alarm to draw attention to the infant in the vehicle.

one embodiment of the infant seat alarm system 10, when both the SW1 16 is closed and the SW2 18 is closed the timer circuit 62 is completed, thereby causing emission of the audible sound of the alarm 50 (see description below). In one embodiment the SW1 16 may comprise a micro-switch that is open when the infant seat 12 is unoccupied and the SW2 18 may comprise a micro-switch that is closed when the detector seat 14 is unoccupied. If the infant seat 12 is occupied SW1 16 closes. If a person sits on the detector seat 14 within the predetermined countdown time (such as about one minute), the SW2 18 of the detector seat opens. When the SW2 18 opens and the SW1 16 is closed, a countdown time of the timer circuit 62 is cancelled and prevents the alarm 50 from emitting an audible sound.

In the illustration of FIG. 1, the infant seat 12 may be a conventional child safety seat approved by governmental authorities, but the infant seat may be of a different shape. The infant seat 12 may be installed in a rear seat of the vehicle, but may be installed in any portion of the vehicle without limiting the functionality of the infant seat alarm system 10 as described herein.

Referring to FIG. 2, a perspective view of a back portion of the infant seat 12 shows the power supply 30 may be coupled to the timer device 20. A power supply wire 26 may connect the power supply 30 to the timer device 20. In one embodiment the power supply 30 may have at least one low voltage DC battery as a power source. It is understood that the power source may be any suitable battery that permits the infant seat alarm system 10 to be independent of the power supply of the vehicle. Suitable batteries may include, but are not limited to 1.5 volt C, D, AA or AAA size DC batteries, 9V DC batteries and the like. Any combination of one or more batteries may be used. The power supply 30 may also have an AC power source. It is understood that the power supply (such as a car battery) of the vehicle may be used as a back-up power supply of the timer device 20. FIG. 2 illustrates an embodiment where the at least one SW2 wire 24 is coupled to a portion of the timer device 20.

Figure 3A:
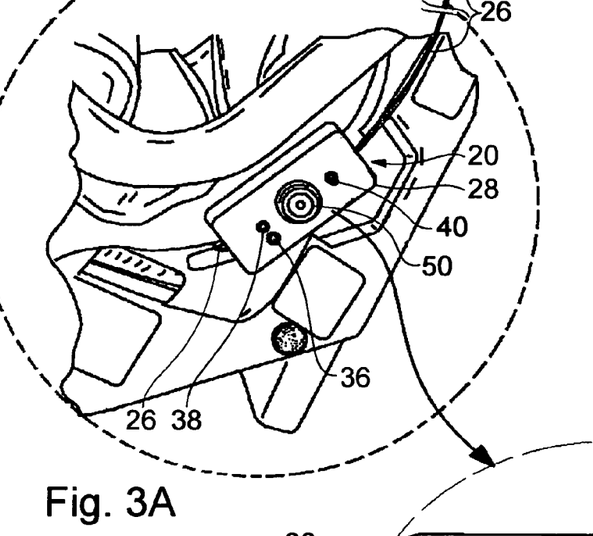
FIG. 3A is a perspective view showing the housing of the timer device located on a portion of the infant seat of FIG. 2.

Referring to FIG. 3A, in one embodiment the timer device 20 is coupled to a portion of the infant seat 12. The timer device 20 may comprise a housing 28 and the power supply wire 26 may be coupled to a portion of the timer device. A portion of the housing 28 may comprise more than one jack. The housing 28 may further comprise a second jack 38 and a third jack 40.

one embodiment a lead 42 of a third switch wire 56 of a third switch 44 (see FIG. 8 and description below) may be coupled to the second jack 38. Furthermore, an end of a lead (not shown) of a second alarm wire 60 of a second alarm 52 may be coupled to the third jack 40. The second alarm 52 may be located in a portion of the vehicle or on an outer portion of the vehicle (as illustrated in FIG. 7).

It is understood that the locations of each of the first jack 36, the second jack 38 and the third jack 40 of the housing 28 may be interchanged without materially altering the function of any of these jacks. Furthermore, it is contemplated that each of the jacks 36, 38 and 40 may be any type of connectors. Additionally, a portion of the third switch wire 56 of the third switch 44 may be hard wired to a portion of the timer device 20. Similarly, a portion of the at least one SW2 wire 24 may be hard wired to a portion of the timer device 20. Furthermore, a portion of the second alarm wire 60 of the second alarm 52 may be hard wired to a portion of the timer device 20. It is contemplated that any one of the third switch 44, the detector seat 14 or the second alarm 52 may be wirelessly coupled to the timer device 20.

Referring further to FIG. 3A, the alarm 50 may be located on an outer portion of the housing 28 of the timer device 20. In an embodiment where the timer device 20 is located in the vehicle, the alarm 50 may emit an audible sound that may be perceived by a person outside the vehicle when the detector seat 14 is unoccupied and the infant seat is occupied. When the alarm 50 emits an audible sound, the person outside the vehicle may either remove the infant from the vehicle or deactivate the alarm by sitting in the detector seat 14.

Figure 3B:
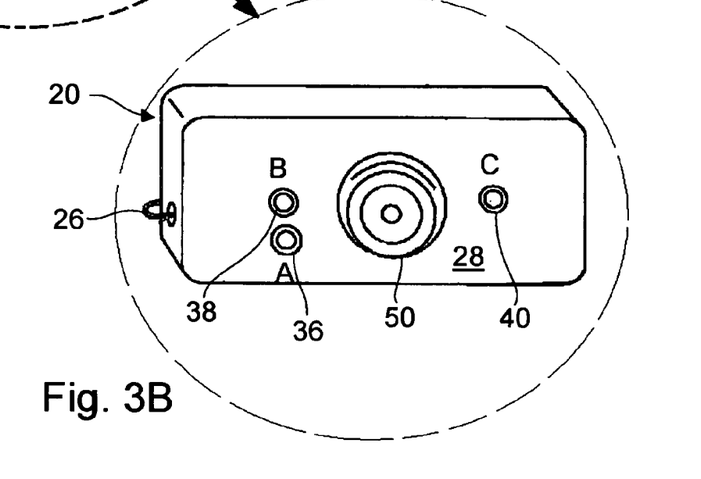
FIG. 3B is a perspective view showing an exploded view of the housing of the timer device of FIG. 2.

FIG. 3B is a perspective view showing an exploded view of the housing 28 of the timer device 20 as described above. A portion of the housing 28 may include one or more jacks (or sockets) such as jacks 36, 38 and 40 and one or more alarms such as alarm 50. Additionally, as illustrated in FIG. 3B, a portion of one or more power supply wires such as the power supply wire 26 may be connected to a portion of the housing 28. In an embodiment of the timer device 20, the timer device may further comprise the power supply 30, thereby obviating the need to have two separate housings for each of the timer device and the power supply. In this embodiment of the timer device 20, a power source may be one or more batteries of any of the following types: nickel cadmium, nickel metal hydride, lithium, alkali, as well as the previously described 1.5 volt C, D, AA or AAA size DC batteries, 9V DC batteries and the like. The batteries may be single use or rechargeable. It is contemplated that other power sources including, but not limited to one or more photo cells or any electromechanical devices may be used in the system 10.

Figures 4A, 4B:
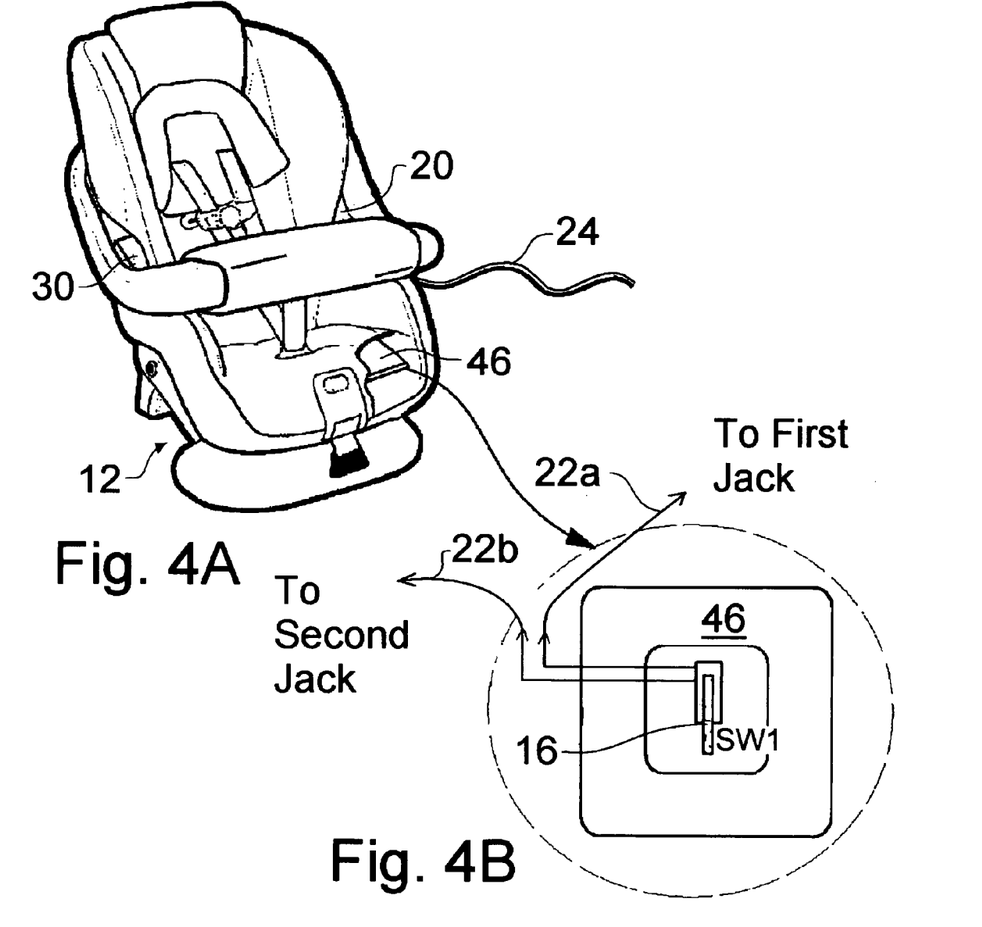
FIG. 4A is a perspective view of the front side of the infant seat of FIG. 1 with a partial sectional view of a member having a sensor.
FIG. 4B is an exploded top view of member of FIG. 4A.

Referring now to FIG. 4A, a first member 46 is located in a portion of the infant seat 12. The first member 46 may comprise at least one sensing switch (illustrated as SW1 16 in FIG. 4B. In FIG. 4A, when an infant sits in the infant seat 12, the SW1 16 is activated. Without limitation, it is contemplated that the sensing switch may be a weight sensing switch, a thermal sensing switch or a motion sensing switch and the like. As described above, in one embodiment the sensing switch is the SW1 16 which is in an open position when the infant seat 12 is unoccupied by an infant and toggles to a closed position when the infant seat is occupied by the infant. Referring to FIG. 4B, in one embodiment the SW1 16 is located on a portion of the first member 46. The first member 46 may comprise any material, including, but not limited to foam, textile, plastic and the like. Furthermore, FIG. 4B illustrates that an end of a first wire 2a is connected to a portion of the SW1 16. An opposite end of the first wire 22a is connected to a portion of the first jack 36 (see FIG. 6 and the description below). Similarly, FIG. 4B illustrates that an end of a second wire 22b is coupled to a portion of the SW1 16 and an opposite end of the second wire 22b is coupled to the second jack 38 (see FIG. 6 and the description below).

Figures 5A, 5B:
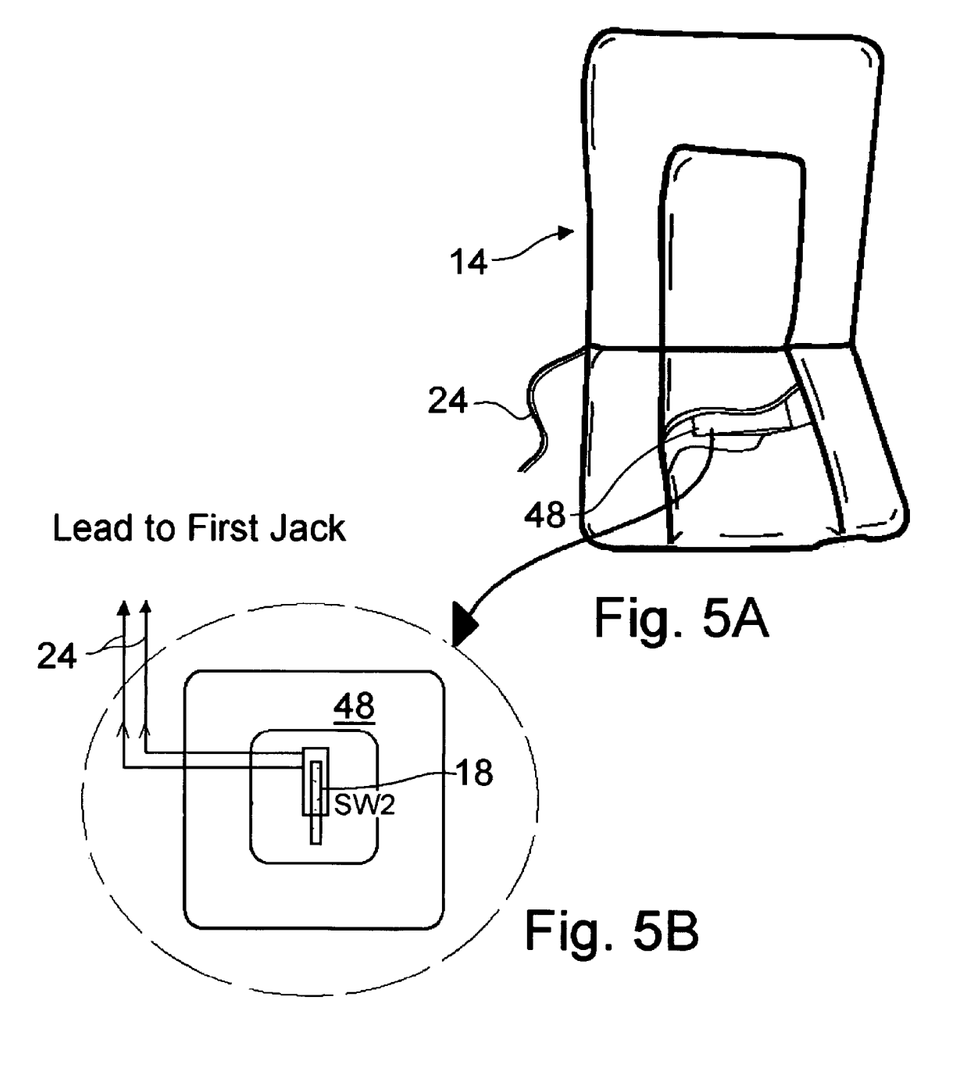
FIG. 5A is a perspective view of the front side of the detector seat of FIG. 1 with a partial sectional view of a second member having a sensor.
FIG. 5B is an exploded top view of the second member of FIG. 5A.

According to FIG. 5A, a second member 48 is located in a portion of the detector seat 14. As illustrated in FIG. 5B the second member 48 comprises at least one sensing switch (illustrated as SW2 18 in FIG. 5B). In FIG. 5A, when a person (such as a driver of the vehicle) sits in the detector seat 14, the second weight sensing switch may be activated. Without limitation, it is contemplated that the sensing switch of the detector seat 14 may be a weight sensing switch, a thermal sensing switch or a motion sensing switch and the like. As described above, in one embodiment the sensing switch may be the SW2 18 which is in a closed position when the detector seat 14 is unoccupied by a person and toggles to an open position when the detector seat is occupied by the person.

Referring to FIG. 5B, in one embodiment the SW2 18 is located on a portion of the second member 48. The second member 48 may comprise any material; including, but not limited to foam, textile, plastic and the like. According to FIG. 5B each one of an end of each of one or more SW2 wires 24 may be connected to a portion of the SW2 18. Furthermore as illustrated in FIG. 5B each one of an opposite end of each of one or more SW2 wires 24 may be coupled to a portion of the first jack 36 (see also FIG. 6 and description below).

FIG. 6 is a schematic of one embodiment of a timer circuit 62 (labeled MULTI-MODE TIMER) of an inner portion of the timer device 20.

As illustrated in FIG. 6 an end of a first wire 24a of the at least one SW2 wires 24 may be coupled to a portion of the first jack 36 and an opposite end of the first wire of the at least one SW2 wires may coupled to an end of SW2 18. An end of a second wire 24b of the at least one SW2 wires 24 may be coupled to an opposite end of SW2 18. An opposite end of the second wire 24b of the at least one SW2 wires 24 may be coupled to a portion of the first jack 36. An end of the detector seat wire 54 may be coupled to a portion of the first jack 36, and an opposite end of the detector seat wire 54 may be coupled to a portion of the first timer circuit interface 32.

Furthermore, an end of the first wire 22a may be coupled to a portion of the first jack SW1 36 and an opposite end of the first wire 22a may be coupled to a portion of SW1 16. Consequently, referring to FIG. 6, the first weight sensing switch 16 (labeled SW1 16 in FIG. 6) is in series with the second weight sensing switch 18 (labeled SW2 18 in FIG. 6).

As illustrated in FIG. 6 an opposite end of the SW1 16 is coupled to an end of the second wire 22b and an opposite end of the second wire 22b is coupled to a portion of the second jack 38. A portion of the second jack 38 is coupled to a portion of the first timer circuit interface 32. When the SW1 16 is closed (infant seat 12 is occupied), and the SW2 18 is closed (detector seat 14 is unoccupied), a countdown cycle of the timer circuit 62 begins. After a predetermined countdown time (such as about one minute) a portion of the timer circuit 62 communicates with at least one of the alarm 50 and the second alarm 52 which emit an audible sound to attract the attention of a person that an infant is alone in the vehicle.

In one embodiment, one end of a pair of alarm wires 58 may be coupled to a portion of the alarm 50 and an opposite end of each of the pair of alarm wires 58 may be coupled to a portion of the second timer circuit interface 34 (see FIG. 6). A portion of the third jack 40 may be coupled to a portion of the alarm 50. Consequently, when the lead of the second alarm wire 60 engages the third jack 40, both the alarm 50 and the second alarm 52 may be coupled to the second timer circuit interface 34.

Figure 7:
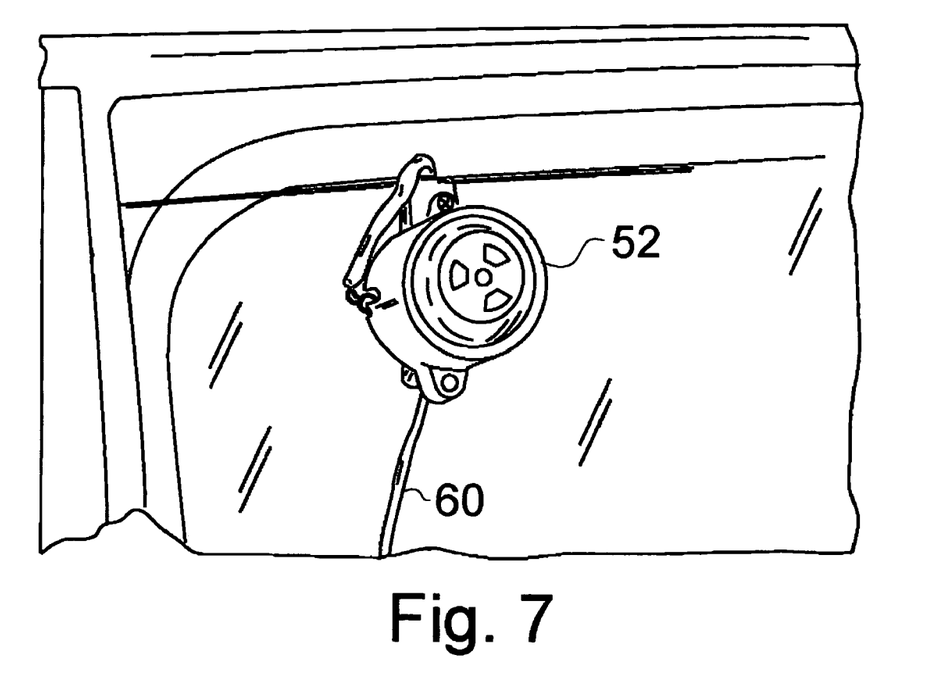
FIG. 7 is a perspective view of an alarm located on a portion of a vehicle window.

Referring to FIG. 7, in an embodiment of the infant seat alarm system 10, the second alarm 52 may be coupled to an external portion of the vehicle. Specifically, as illustrated in FIG. 7 the second alarm 52 is coupled to a portion of a window of the vehicle with an end of the second alarm wire 60 being coupled to a portion of the second alarm 52. When the second alarm 52 is an external alarm the range of sound emission by the external alarm may be extended. It is understood that the second alarm 52 may be located on any portion of the vehicle.

Figure 8:
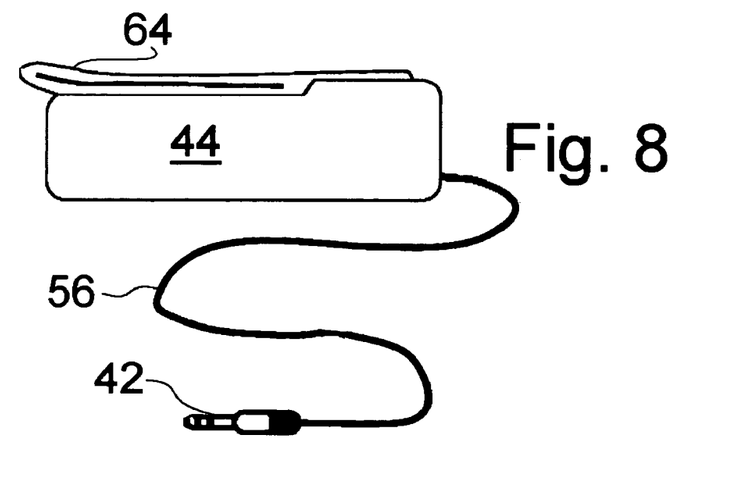
FIG. 8 is a perspective view of a hand switch configured for use with the timer device of FIG. 3B.

Referring now to FIG. 8, in one embodiment the third switch 44 may comprise an actuator 64. It is understood that the actuator 64 may be any actuator including, but not limited to a lever, a button, a touch pad and the like. In the embodiment of FIG. 8, an end of the third switch wire 56 is coupled to a portion of the third switch 44 and the opposite end of the third switch wire 56 is coupled to the lead 42. The lead 42 may be configured to couple to the second jack 38 of the timer device 20. When the lead 42 engages the second jack 38, a portion of the third switch 44 may be coupled both to the SW1 16 of the infant seat 12 and the second timer circuit interface 34.

In one embodiment with the lead 42 engaging the third jack 40 when the actuator 64 is engaged by a person, a micro-switch (not shown) located in the third switch 44 remains in an open position. If the actuator 64 is disengaged, the micro-switch of the third switch 44 closes. After a predetermined countdown time an audible sound may be emitted by the alarm 50 if the infant seat 12 is occupied (SW1 being closed) and the actuator 64 is disengaged. Additionally, the second alarm 52 may emit an audible sound if the lead of the alarm wire 52 engages the third jack 40.

Exemplary Method for Using the Infant Seat Alarm System

A method of both detecting and alerting that an infant is unattended in a vehicle comprises a number of steps. In one step an infant seat 12 is placed in the vehicle with the infant seat having a first sensor 16. A detector seat 14 may be placed in the vehicle with the detector seat having a second sensor 18, the first sensor being coupled to the second sensor. A timer device 20 is coupled to each of the first sensor 16 and the second sensor 18. In another step, the timer device 20 is powered with at least one power supply 30 independent of a power source of the vehicle. At least one alarm 50, 52 is coupled to the timer device 20 and an audible sound is emitted by the alarm after a predetermined time if both the first sensor 16 detects the infant seat 12 is occupied and the second sensor 18 detects the detector seat 14 is unoccupied.

The method may further comprise other steps. A switch 44 may be selectively coupled to the timer device 20. An audible sound may be emitted by the alarm 50, 52 if both the infant seat 12 is occupied and the switch 44 is deactivated when a person does not engage an actuator 64 of the switch. Furthermore, emission of an audible sound from the alarm 50, 52 may be suppressed if both the first sensor 16 detects the infant seat 12 is occupied and the switch 44 is continuously activated by a person engaging the actuator 64 of the switch. In this embodiment, an infant may be continually accompanied by the person while the person engages the actuator 64 of the switch 44.

In further steps of the method, a timer circuit 62 of the timer device 20 is provided with the timer circuit being selectively coupled to at least one alarm 50. The predetermined time may be at least about one minute. In one embodiment the predetermined time may be varied by a user of the system 10 and may be adjusted to be less than about one minute. In a further step of the method, if the infant seat 12 is occupied and the detector seat 14 is occupied within the predetermined time, or the infant is removed from the infant seat 12 while the detector seat 14 is unoccupied, emission of an audible sound by the alarm 50, 52 is suppressed.

The method further comprises the step of coupling at least one external alarm 52 to a portion of the vehicle to extend the external range of sound emission by the external alarm.

While the invention has been particularly shown and described with reference to preferred embodiments thereof, it will be understood by those skilled in the art that the foregoing and other changes in form and details may be made therein without departing from the spirit and scope of the invention. For example, instead of the infant seat described above, a portion of a vehicle may be designated as an infant area where an infant may be located. The designated infant area may be configured in the same manner as the infant safety seat with the infant area coupled to a detector seat or a switch as described above.

What is claimed is:

1. An infant seat alarm system configured to both detect and alert the presence of an unattended infant in a vehicle comprising, in combination:

an infant seat in said vehicle, said infant seat having a first weight sensing switch located in a portion of said infant seat;

a detector seat in said vehicle, said detector seat having a second weight sensing switch located in a portion of said detector seat, said first weight sensing switch coupled to said second weight sensing switch;

a timer device comprising a housing and a timer circuit, each of said first weight sensing switch and said second weight sensing switch coupled to both a portion of said housing and to said timer circuit;

at least one power supply, said at least one power supply coupled to a portion of said timer device; and at least one alarm coupled to said timer circuit, wherein said timer circuit is configured to actuate said at least one alarm to emit an audible sound after a predetermined time if both said infant seat is occupied and said detector seat is unoccupied, both said first weight sensing switch being closed and said second weight sensing switch being closed to complete said timer circuit.

2. The system according to claim 1 further comprising a third switch selectively coupled to said timer circuit of said timer device, wherein said at least one alarm emits an audible sound if both said infant seat is occupied and said third switch is inactive, said first weight sensing switch configured to be closed and said third switch configured to be closed to complete said timer circuit, and said audible sound of said at least one alarm being suppressed if both said first weight sensing switch detects said infant seat is occupied and said third switch is actuated by a person, said first weight sensing switch configured to be closed and said third switch configured to be open to prevent completion of said circuit coupled to said at least one alarm.

3. The system according to claim 1 wherein said predetermined time is at least about one minute.

4. The system according to claim 1 wherein said at least one power supply comprises at least one DC power source independent of a power supply of said vehicle.

5. An infant alert system configured to both detect and alert the presence of an unattended infant in a vehicle comprising, in combination:

an infant seat in said vehicle, said infant seat having a first sensor; a detector seat in said vehicle, said detector seat having a second sensor, said first sensor coupled to said second sensor;

a timer device coupled to each of said first sensor and said second sensor; and at least one alarm coupled to said timer device, wherein said timer device is configured to actuate said at least one alarm to emit an audible sound after a predetermined time when both said first sensor detects said infant seat is occupied and said second sensor detects said detector seat is unoccupied.

6. The system according to claim 5 further comprising a switch selectively coupled to a timer circuit of said timer device, wherein said at least one alarm emits an audible sound if both said infant seat is occupied and said switch is inactive, and said switch suppresses emission of an audible sound from said at least one alarm when both said first sensor detects said infant seat is occupied and said switch is actuated by a person.

7. The system according to claim 5 further comprising at least one power supply, said at least one power supply coupled to a portion of said timer device.

8. The system according to claim 5 further comprising a housing of said timer device, said first sensor coupled to a portion of said housing and said second sensor coupled to a portion of said housing.

9. The system according to claim 6 wherein said switch is coupled to a portion of a housing of said timer device.

10. The system according to claim 5 wherein said first sensor comprises a first weight detecting switch and said second sensor comprises a second weight detecting switch.

11. The system according to claim 10 wherein said first weight detecting switch is closed when said infant seat is occupied and said first weight detecting switch is open when said infant seat is unoccupied.

12. The system according to claim 10 wherein said second weight detecting switch is closed when said detector seat is unoccupied and said second weight detecting switch is open when said detector seat is occupied.

13. The system according to claim 5 wherein said predetermined time is at least about one minute.

14. The system according to claim 5 further comprising a timer circuit of said timer device, said timer circuit selectively coupled to said at least one alarm.

15. The system according to claim 5 further comprising at least one external alarm coupled to said timer device, said at least one external alarm selectively coupled to a portion of said vehicle.

16. The system according to claim 5 wherein a timer circuit of said timer device is coupled to at least one of said first sensor and said second sensor.

17. A method of both detecting and alerting that an infant is unattended in a vehicle comprising the steps of:

providing an infant seat in said vehicle, said infant seat having a first sensor;

providing a detector seat in said vehicle, said detector seat having a second sensor, said first sensor coupled to said second sensor;

providing a timer device coupled to each of said first sensor and said second sensor;

powering said timer device with at least one power supply independent of a power source of said vehicle;

providing at least one alarm coupled to said timer device; and emitting an audible sound by said at least one alarm after a predetermined time if both said first sensor detects said infant seat is occupied and said second sensor detects said detector seat is unoccupied.

18. The method according to claim 17 further comprising the steps of:

providing a switch selectively coupled to said timer device;

emitting an audible sound by said at least one alarm if both said infant seat is occupied and said switch is deactivated; and suppressing emission of an audible sound from said at least one alarm if both said first sensor detects said infant seat is occupied and said switch is activated.

19. The method according to claim 17 further comprising the steps of:

providing a timer circuit of said timer device, said timer circuit selectively coupled to said at least one alarm;

providing said predetermined time is at least about one minute;

suppressing emission of an audible sound by said at least one alarm by removing said infant from said infant seat; and occupying said detector seat within said predetermined time if said infant seat is occupied to suppress emission of an audible sound by said at least one alarm.

20. The method according to claim 17 further comprising the step of: coupling at least one external alarm to a portion of said vehicle to extend the range of sound emission by said at least one external alarm.

* * * * *